United States Patent [19]

Lenk

[11] 4,038,005
[45] July 26, 1977

[54] NOZZLE PLATE HOLDER

[75] Inventor: Erich Lenk, Remscheid-Lennep, Germany

[73] Assignee: Barmag Barmer Maschinenfabrik, Wuppertal, Germany

[21] Appl. No.: 584,925

[22] Filed: June 9, 1975

[30] Foreign Application Priority Data

June 20, 1974 Germany .................. 2429654

[51] Int. Cl.² ................................ B29F 3/00
[52] U.S. Cl. ............................ 425/190; 425/464
[58] Field of Search ............ 425/464, 468, DIG. 29, 425/190, 192 R, 461; 72/473

[56] References Cited

U.S. PATENT DOCUMENTS

| 861,143 | 7/1907 | Scott | 403/DIG. 7 |
|---|---|---|---|
| 3,259,938 | 7/1966 | Martin | 425/464 |
| 3,351,691 | 11/1967 | Wilford | 425/468 X |
| 3,427,685 | 2/1969 | Gove et al. | 425/464 |
| 3,479,692 | 11/1969 | Van Den Biggelaar | 425/464 X |

FOREIGN PATENT DOCUMENTS 1,096,594   3/1959   Germany

Primary Examiner—Richard B. Lazarus
Attorney, Agent, or Firm—Keil, Thompson & Shurtleff

[57] ABSTRACT

Holding means for a nozzle plate in apparatus for extruding a thermoplastic polymer melt, especially in melt-spinning apparatus for producing synthetic filaments from a fiber-forming polymer, said holding means essentially including a housing having a cavity open at its discharge end to receive the nozzle plate arranged perpendicularly to the axial direction of the flow of the polymer melt therethrough and having a peripheral groove near its discharge end for removably inserting a plurality of supporting ledge elements for seating the nozzle plate, preferably in a self-sealing assembly with a sealing ring or gasket contacting the directly adjacent bearing surfaces of each of the nozzle plate, the supporting ledge elements and the inner wall of the housing.

9 Claims, 8 Drawing Figures

NOZZLE PLATE HOLDER

Holding devices for nozzle plates in extruders for thermoplastic melts have usually been designed with projecting seatings or load bearing members which are tightly connected with the side walls of the holding device, i.e. the frame or housing for the extruder. See, for example, the disclosure of a typical holder in a spinning extruder for producing synthetic thermoplastic filaments as shown in German Pat. (DT-OS) No. 2,117,130. For those spinning units which are designed solely for rectangular spinning plates, the side walls or housing must be open on one side so that the nozzle plate can be shoved laterally into position, so that it is inserted from one side in the manner of a drawer. With such an opening for the drawer-like insertion of the nozzle plate, there is no support for the nozzle plate on or at this side opening. Also, it is necessary to carefully guide the laterally shoved plate into place, and the space requirements on one side limit the extent to which the nozzle plates or spinning units can be mounted adjacent one another.

In other known spinning units with individual nozzle plate holders, where the bearing surfaces project from the side walls, it is common to use threaded projections, i.e. a screw-thread mounting means in a cylindrical housing member as disclosed for example in the Swiss Pat. (CH-PS) No. 432,711. The disadvantage of this type of arrangement resides in the fact that high stresses are placed on the holding screw out of a need to prevent any leakage caused by the compressive loading of the melt. Although this threaded mounting of the nozzle plate can be accomplished from below, the assembly itself is quite difficult and relatively time consuming, especially due to the large number of turns required to complete the mounting of the nozzle plate.

It is an object of the present invention to avoid the disadvantages illustrated by such prior art and to provide a holder for a nozzle plate which offers a simple assembly, an insertion of the nozzle plate from below and relative freedom from wear and similar problems inherent in a threaded screw mount.

These and other objects and advantages of the invention are achieved in accordance with the appended claims as supported by the following detailed specification of a number of preferred embodiments of the nozzle plate holder taken with the accompanying drawings in which:

Figure 4:
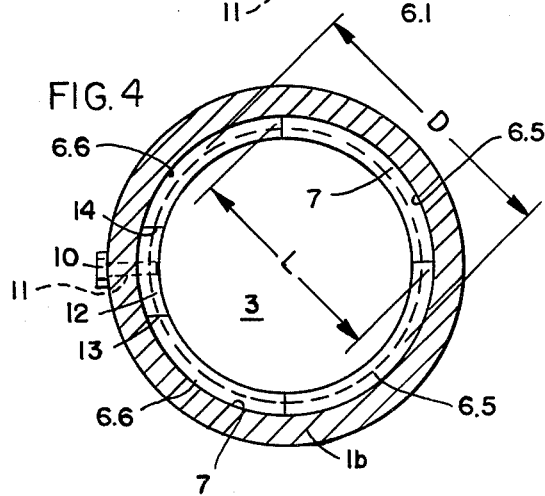
Figure 5:
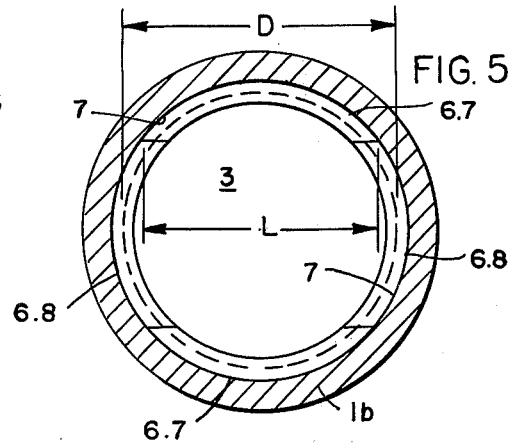
Figure 6:
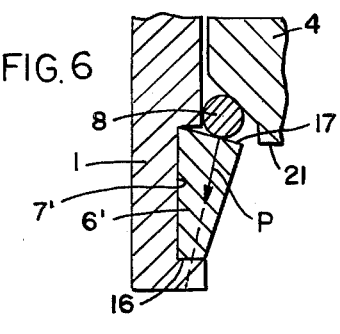
Figure 7:
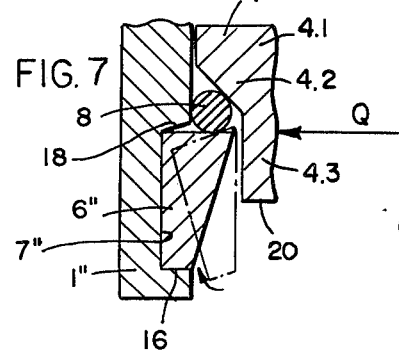
Figure 8:
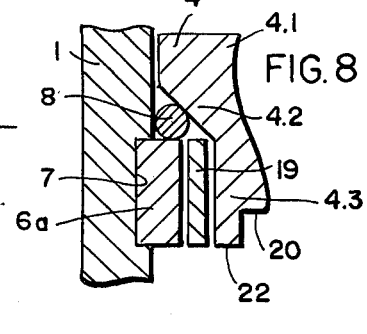

FIGS. 4 and 5 are lateral or horizontal cross-sectional view of two additional embodiments of the holding means of the invention in a spinning head adapted to receive a circular nozzle plate; and FIGS. 6, 7 and 8 are partial sectional views to illustrate in detail certain preferred constructions of individual holding or supporting elements useful for mounting either rectangular or circular nozzle plates.

Figure 1:
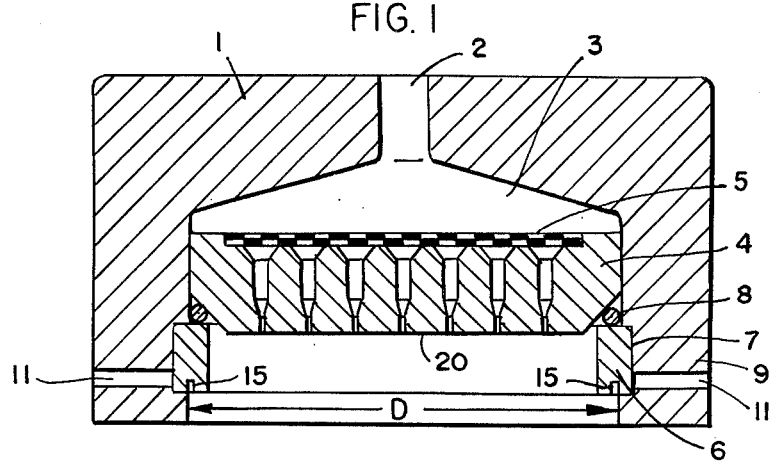
FIG. 1 is an axial or a central vertical cross-sectional view of an individual extrusion or spinning head with holding means for the nozzle plate constructed according to one preferred embodiment of the invention.

The extrusion head or nozzle plate holder 1 as shown in FIG. 1 has a feed entry conduit 2 located centrally or axially at its upper end where it is connected in a conventional manner to a screw extruder supplying a molten thermoplastic polymer to the hollow space 3. For the spinning of a fiber-forming polymer into filaments a metering pump is usually inserted in the feed line to the holder 1.

The nozzle plate 4 is adapted to be axially inserted from below into the hollow space 3, preferably with a filter pack or screen 5 already installed in its upper surface. Other conventional members may also be provided in the hollow space 3, such as deflection plates or similar distributor means to ensure a uniform distribution of the polymer melt to the individual spinning nozzles or bores leading to the spinning orifices 12. Typical spinning orifices may have a round or rectangular cross-section for use in the spinning or synthetic filaments or strands. Other cross-sections are also suitable, and it will be understood that the holder of the invention is advantageously useful as a die holder in any extrusion apparatus.

The nozzle plate 4 rests on and is retained by the supporting ledge elements 6 which are inserted in the groove 7 extending completely around the inner periphery of the side walls 9 of the holder 1. These can also contain lateral openings 11 into the groove 7 for the insertion of safety screws 10 (see FIG. 4) and/or for using a rod or the like to push out the ledge elements 6 when the unit is disassembled.

When using safety screws 10 for tightening individual ledge elements 6 in place, e.g. by means of a counter-threaded opening in each element 6 to receive the screw, the assembly of the unit is greatly facilitated. Even though these screws extend into the ledge elements, they do not need to withstand heavy stresses, since the are not placed under a permanent heavy load during operation of the extruder or spinning head. Instead, such screws are essentialy used as an aid in assembly without acting as load-bearing members.

The sealing ring 8, preferably an 0-ring, is undivided so as to extend in a continuous loop around the inner periphery of the side walls 9 of the holder 1. This sealing ring 8 preferably consists of a flowable or deformable material, but when in the form of an 0-ring, fits into the triangle formed between the upper bearing surfaces of the ledge elements 6, the beveled contact surfaces of the nozzle plate 4 and the inner wall surface of the holder 1 just above the groove 7. This arrangement has the effect not only of sealing the nozzle plate to prevent the escape of melt, but also especially to effectively distribute the load over the supporting ledges 6 and side walls 9.

There must be a plurality of ledge elements 6 to permit them to be inserted into the groove 7 in end-to-end proximity so as to completely or substantially completely encircle the inner wall surfaces of the holder 1, this insertion following that of the nozzle plate 4 into the cavity 3 which is preferably deep or high enough so that the bottom edge of the nozzle plate 4 will fall above the top edge of groove 7 in the assembly of the ledge elements. However, the shape and placement of these ledge elements can be varied as described hereinafter to further facilitate their insertion and removal even though space requirements limit the inward or upward placement of the nozzle plate.

Figure 2:
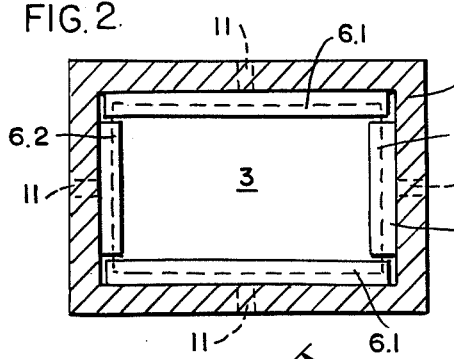
FIGS. 2 and 3 are lateral or horizontal cross-sectional views of two different embodiments of the holding means of the invention of a spinning head adapted to receive a rectangular nozzle plate.
Figure 3:
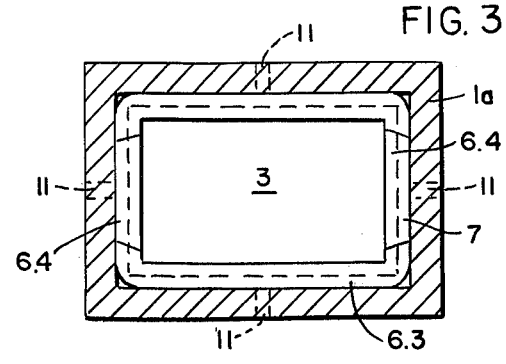

In the rectangular holders or spinning heads 1a shown in FIGS. 2 and 3, there are illustrated two preferred embodiments of supporting ledge elements inserted into the peripheral groove 7 so as to provide a self-sealing arrangement with a suitable sealing ring laid on their upper bearing surface which projects inwardly on all four sides into the hollow space 3.

In FIG. 2, two bar-shaped ledge elements 6.1 extend in the groove along opposite sides of the holder 1a while another two shorter elements 6.2 are inserted in the groove of the other two opposite sides of the holder. These two shorter ledge elements 6.2 are arranged perpendicularly in end-to-end relationship with the longer elements 6.1 so as to effectively lock the longer elements in place in the groove 7. A similar arrangement is illustrated by FIG. 3 in which the longer elements 6.3 extend with rounded corners in the groove 7 so as to provide small end segments occupying a portion of the groove in the narrower side walls of the rectangular holder 1a, the two opposing shorter ledge elements 6.4 having a wedge-like appearance as viewed from above to register with the protruding end segments of the ledge elements 6.3, thereby holding all of the ledge elements securely in place. This latter arrangement is also capable of being adapted in an analogous manner to a holder or housing 1 of circular cross-section.

FIGS. 4 and 5 indicate the manner in which the ledge elements can be arranged around the periphery of the housing or holder 1b in the circular groove 7 to support a correspondingly circular nozzle plate. As shown in FIG. 4, these supporting ledge elements are arranged in end-to-end relationship around the groove 7, with only one small supporting ledge segment 12 being secured by the safety screw 10 to prevent its movement out of the groove. This fastened segment 12 has its oppositely disposed ends 13 and 14 parallel to each other to facilitate the insertion and removal of this segment as the key-locking portion of the assembled ledge elements in the groove. The remaining arcuate segements 6.5 and 6.6 of the supporting ledge or shelf for the nozzle plate must satisfy the structural requirement that their greatest extension L is smaller than the largest diameter D of the opening of the holder or housing 1b into the hollow space 3.

Thus, it will be apparent in all cases that the individual ledge elements 6 must be capable of being inserted past the lower rim or discharge opening into the hollow space 3 and turned to the horizontal, i.e., perpendicular to the extrusion or spinning axis, so as to be fitted laterally into the groove 7. This is likewise true of holders or housings which have a square or rectangular shape as in FIGS. 2 and 3, i.e. the various ledge elements 6 must be of a length which enables them to be introduced into the space 3 and fitted in a direction perpendicular to the extrusion axis into the groove 7.

In general, it is therefore preferable to provide a minimum of at least four ledge elements in relatively close end-to-end engagement around the groove periphery. Also, at least one ledge element or peripheral segment of the ledge supporting means is preferably constructed as a wedging or locking means to securely hold the assembled elements in the groove.

In FIG. 5, there are exactly four ledge elements in opposing paired segments 6.7 and 6.8, the latter segments 6.8 having parallel end faces to facilitate their insertion in groove 7 after the segments 6.7 have been mounted in place, both segments 6.8 preferably providing a wedging or locking action simply by their insertion. One advantage of a circular arrangement of this kind resides in the fact that exact positions in the groove are not required, and one can even omit the radial or lateral openings or bores 11. If desired, small slots or bores 15 can be set back into the bottom or exposed edge face of the ledge elements (see FIG. 1) for the insertion of a tool in order to remove these elements.

In FIG. 6, another preferred embodiment is shown in which the upper supporting edge face 17 of the ledge element 6' is inclined from the horizontal in such a manner that the normal force P, i.e. the supporting force perpendicular to the face 17 exerted thereon by the sealing ring 8, goes directly to the horizontal or lateral bottom groove wall 16 which carries the lower end or edge of the ledge element 6' having the same width and thus coming flush with the inner wall of the housing 1 at this point. This construction permits an advantageous distribution of the sealing force over the housing or holder 1.

In general, all of the illustrated embodiments of the invention have in common a construction in which the respective bearing or supporting surfaces of the nozzle plate, ledge elements and housing inner wall extend tangentially of the sealing ring to form a triangle which substantially encloses the sealing ring. In addition to a better distribution of the sealing forces, this arrangement guarantees a leak-proof assembly and mounting of the nozzle plate in the holder or spinning head housing. Moreover, the individual parts are not easily deformed or damaged in the assembly and disassembly of the extrusion apparatus or in its operation.

In FIG. 7, the nozzle plate 4 has an upper part 4.1 which completely fills the hollow space 3, i.e. to fit smoothly against the inner walls of the housing 1, and then the nozzle plate is gradually reduced in horizontal or lateral cross-section over the intermediate portion 4.2 to provide a lower portion 4.3 of smallest cross-section as taken on the line or plane in the direction Q. This lower portion 4.3 is dimensioned to accomodate and overlap the special trapezoidal ledge elements 6'' while providing an approximately triangular to trapezoidal annular space in which the sealing ring 8 is supported on the upper or bearing face 18 of the element 6''. In this instance, the lower portion 4.3 of the nozzle plate prevents the individual ledge elements 6'' from being dislodged or easily displaced from the groove 7'' unless they are deliberately moved into the position shown in phantom during the assembly or disassembly operation. It will be noted that groove 7'' has a slightly inclined upper wall surface to accomodate this manipulation of the ledge element 6'', for example as it is inserted and rotated in the direction of the lower arrow.

In FIG. 8, the construction and assembly of the holder is similar to that of FIG. 7, except that a spacer ring 19 is inserted between the lower portion 4.3 of the nozzle plate and the supporting ledge element 6a carried in the peripheral groove 7 of housing 1. This spacer ring 19 is of the same height or axial dimension as the ledge element 6a and extends undivided, i.e. continuously, around the inner peripheral surfaces of all of the ledge elements so that they are prevented from dropping out of the groove 7. If desired, this spacer ring 19 may be secured in place by means of a screw connection with the nozzle plate 4 or with the supporting ledge element 6a. This screw or bolt fastening can also be accomplished as shown in FIG. 10 by extending a counter-threaded bore into the spacer 19. This also has the advantage of permitting removal of the screw 10 from the bore 11 to permit the spacer 19 to drop vertically out of the housing 1, thereby also facilitating the removal of the ledge elements 6a.

These latter embodiments, especially as shown in FIG. 8, are especially useful in circular nozzles where the housing is in the form of a cylindrical die holder for an extruder for the spinning head of a melt spinning apparatus. Circular nozzle plates also have the advantage of being symmetrical so as to be supported by cylindrical walls which are relatively strong for a minimum wall thickness. Also, when using the nozzle plates 4 of FIGS. 7 and 8, it is possible to bring the discharge or outlet face 20 of the nozzle plate much closer to the lower or discharge end of the housing 1 and providing a correspondingly larger interior space 3 with overall dimensions otherwise being the same. In all of the embodiments including FIG. 1, the outlet face 20 of the nozzle plate 4 preferably falls below or axially forwardly of the bearing or contact surface of the ledge elements 6 or at least has a forwardly projecting peripheral shoulder 21 or rim 22 as indicated in FIGS. 6 and 8.

The constructions recommended in FIGS. 4, 5 and 6 serve especially well in preventing the ledge elements 6 from falling out of place, i.e., for securing these elements in the groove 7. The special advantage of the embodiments of FIGS. 7 and 8 resides in the fact that by the design of the nozzle plate and/or the provision of the spacer ring, a very simple and unobstructed assembly of the supporting ledge elements with the nozzle plate becomes possible while the inserted ledge elements are nevertheless securely held in the groove of the housing inner wall. It is emphasized that all of the proposed constructions are useful for both circular and rectangular nozzle plates. With circular nozzle plates, the ring-shaped assembly of ledge elements is preferably divided into the individual arcuate elements along two secants which have the same distance from the midpoint. With rectangular nozzle plates, the ledge elements in each case preferably extend over a single side wall. Other arrangements using various segments or divisions of the supporting ledge means are also quite feasible.

In general, all ledge elements as well as the nozzle plate, housing, and other parts of the apparatus coming in contact with the melt are preferably constucted of a metal or metal alloy, e.g. steel alloys, capable of resisting the high temperatures and possible chemical attack of the molten material being extruded.

Numerous other variations of modifications can be made in the nozzle holder of the invention without departing from the spirit or scope of the invention as claimed below.

I claim:

1. In combination with an apparatus for the extrusion of a molten thermoplastic polymer including a nozzle plate arranged perpendicularly to the axial direction of flow of the polymer melt therethrough, an improved holding means for said nozzle plate comprising:
    a housing having side walls enclosing an axially extending cavity, said housing having a feed opening into said cavity at its inlet end to receive said polymer melt for extrusion and a discharge opening at its opposite end, the discharge opening of said housing being open to axially insert said nozzle plate along the innerwall surface formed by the sides of the housing;
    a peripheral groove extending around the inner wall surface of said housing at an axially spaced interval from the discharge end thereof;
    a plurality of supporting ledge elements removably inserted into said peripheral groove in end-to-end proximity and extending completely around the inner periphery of said side walls, the radially innermost ends of said ledge elements projecting out of the groove and into the discharge opening of said housing as a bearing surface to support said nozzle plate when fully inserted in said housing; and
    a sealing ring removably inserted between the nozzle plate and said bearing surface of the ledge elements to support and to seal the nozzle plate against the pressure exerted axially by the melt on the nozzle plate in the discharge direction.

2. Holding means in combination with said appartus as claimed in claim 1 wherein said sealing ring is in sealing contact with the directly adjacent bearing surfaces of said nozzle plate and the housing inner wall surface next to said groove.

3. Holding means in combination with said apparatus as claimed in claim 2 wherein the directly adjacent bearing surfaces of each of the nozzle plate, the supporting ledge elements and the inner wall surface of the housing are inclined toward one another such that their surfaces contacting the sealing ring form a triangle which substantially encloses said sealing ring.

4. Holding means in combination with said apparatus as claimed in claim 1 wherein the bearing surface of each said ledge element is inclined from the axially extending inner wall surface of the housing so that the supporting force normal to said bearing surface follows a line directly to the axially outermost sidewall of the groove which extends laterally into said inner wall surface of the housing.

5. Holding means in combination with said apparatus as claimed in claim 1 including a nozzle plate having an axially innermost portion of maximum cross-section which fits along the inner wall surface of the housing, an intermediate portion of gradually reduced cross-section in the direction of melt flow and an axially outermost portion of minimum cross-section which fits the narrowest opening remaining in the housing at the discharge end after insertion of said ledge elements.

6. Housing means in combination with said apparatus as claimed in claim 5 wherein said intermediate portion of the nozzle plate inclines laterally inwardly from the axially extending inner wall surface of the housing and coacts with the bearing surface of said ledge elements and said housing inner wall surface to substantially enclose said sealing ring carried on said bearing surface.

7. Holding means in combination with said apparatus as claimed in claim 6 wherein said sealing ring is deformable O-ring.

8. Holding means in combination with said apparatus as claimed in claim 1 including a nozzle plate having an added portion extending axially forwardly in the direction of melt flow at a laterally spaced annular distance from said supporting ledge elements and a continuous spacer ring insertable between said nozzle plate and said ledge elements.

9. Holding means as claimed in claim 1 including a nozzle plate having a plurality of spinning orifices for the extrusion of filaments axially therethrough and means to fasten said supporting ledge elements to said housing.

* * * * *

UNITED STATES PATENT AND TRADEMARK OFFICE
CERTIFICATE OF CORRECTION

PATENT NO. : 4,038,005
DATED : July 26, 1977
INVENTOR(S) : Erich Lenk

It is certified that error appears in the above—identified patent and that said Letters Patent are hereby corrected as shown below:

Column 6, line two of Claim 7, after "...said sealing ring is", please insert --a--, so that the second line reads: "...said sealing ring is a deformable...".

Signed and Sealed this

Fifteenth Day of August 1978

[SEAL]

Attest:

RUTH C. MASON
Attesting Officer

DONALD W. BANNER
Commissioner of Patents and Trademarks